United States Patent [19]

Watanabe

[11] Patent Number: 5,509,525

[45] Date of Patent: Apr. 23, 1996

[54] APPARATUS FOR TAKING OUT AND ALIGNING ARTICLES TRANSPORTED THERETO

[75] Inventor: Tomoichi Watanabe, Tokyo, Japan

[73] Assignee: Japan Tobacco Inc., Tokyo, Japan

[21] Appl. No.: 372,999

[22] Filed: Jan. 17, 1995

[30] Foreign Application Priority Data

Jan. 18, 1994 [JP] Japan .................................. 6-003756

[51] Int. Cl.⁶ .................................................. B65G 29/00
[52] U.S. Cl. .................................. 198/474.1; 198/476.1; 198/477.1
[58] Field of Search ............................. 198/469.1, 474.1, 198/476.1, 477.1, 478.1, 480.1, 482.1, 483.1, 605

[56] References Cited

U.S. PATENT DOCUMENTS

| | | | |
|---|---|---|---|
| 4,559,757 | 12/1985 | Focke et al. | 198/478.1 X |
| 4,605,212 | 8/1986 | Kobler | 198/476.1 X |
| 4,823,536 | 4/1989 | Manservigi et al. | 198/476.1 X |
| 5,246,098 | 9/1993 | Boldrini et al. | 198/476.1 |
| 5,275,275 | 1/1994 | Boldrini et al. | 198/482.1 |

FOREIGN PATENT DOCUMENTS

| | | |
|---|---|---|
| 0554753 | 8/1993 | European Pat. Off. . |
| 2058705 | 4/1981 | United Kingdom . |

*Primary Examiner*—James R. Bidwell
*Attorney, Agent, or Firm*—Birch, Stewart, Kolasch & Birch

[57] ABSTRACT

A transfer drum and a takeout drum are provided so that they are arranged diametrically adjacent to each other and can rotate synchronously in opposite directions. Articles are held and moved upward by both a transfer arm and a takeout arm which are located individually at the respective peripheral portions of these drums. The raised articles are transferred to a takeout conveyor mechanism, which extends in the vertical direction, and are moved upward while being decelerated by the conveyor mechanism. An aligning mechanism is provided at the upper end portion of the takeout conveyor mechanism. The decelerated articles are transferred to the aligning mechanism, and are aligned intimately in contact with one another. In this apparatus, the articles can be decelerated in the takeout conveyor mechanism, so that they can be subjected to only a small impact, and can, therefore, be prevented from being damaged.

6 Claims, 8 Drawing Sheets

APPARATUS FOR TAKING OUT AND ALIGNING ARTICLES TRANSPORTED THERETO

BACKGROUND OF THE INVENTION

1. Field of the Invention

The present invention relates to an apparatus for taking out articles, such as cigarette packs packaged by means of a packaging apparatus, from the packaging apparatus and aligning these articles. More specifically, the present invention relates to an apparatus for taking out cigarette packs or the like from a packaging apparatus, which comprises a plurality of transfer drums arranged diametrically adjacent to one another and rotatable within a vertical plane, and aligning them vertically into a nest.

2. Description of the Related Art

Recently, novel apparatuses have been being developed as means for packaging cigarettes for each pack. These apparatuses are designed so that cigarettes for each pack are packaged as they are transferred between a plurality of transfer drums. In one such packaging apparatus, a plurality of transfer drums are arranged diametrically adjacent to one another so as to be rotatable within a vertical plane, and a plurality of heads are arranged around each transfer drum for rotation within the vertical plane. Each two adjacent transfer drums rotate synchronously in opposite directions. The heads are rotated in synchronism with the rotation of the transfer drums by means of cam mechanisms and the like. Each pair of heads of the adjacent transfer drums move facing each other as they pass by a region in which the drums are situated close to each other. Thus, each pair of heads moving through this region make relative motions such that they oppositely approach and leave each other. As this is done, cigarettes for one pack held on one of the heads are transferred to the other head, and at the same time, wrapping paper is inserted between the pair of heads to wrap the cigarettes. Thus, cigarettes are successively transferred from a head of one transfer drum to a head of another drum adjacent thereto. In this process, the wrapping of the cigarettes in the wrapping paper, folding, and other operations are carried out to package the cigarettes for the one pack. Since the packaging apparatus of this type includes no reciprocating parts, its operation can be easily speeded up.

Packs of cigarettes finally packaged in this manner must be taken out from the heads of the transfer drums, and aligned crowding against one another to be delivered to the next stage, e.g., a seal pasting process.

In this crowdedly aligned state, the moving speed of the cigarette packs is extremely low. If the cigarette packs, taken out from the heads of the transfer drums rotating at high speed, are aligned in contact with one another as they are, therefore, each cigarette pack will run against its preceding one to be decelerated suddenly. As a result, the cigarette packs may be damaged by impact, in some cases.

The present invention has been contrived in consideration of these circumstances, and its object is to provide a takeout/aligning apparatus for articles, which can securely receive cigarette packs or some other articles from heads of rotating transfer drums and align them, and in which the articles taken out from the heads are decelerated so slowly that they can be prevented being damaged.

SUMMARY OF THE INVENTION

In order to achieve the above object, an apparatus according to the present invention has the following features.

More specifically, the apparatus of the invention comprises a transfer drum and a takeout drum which are arranged diametrically adjacent to each other and rotates synchronously in opposite directions within a vertical plane. A transfer arm for holding articles is located at the peripheral portion of the transfer drum so as to be rockable within the vertical plane, while a takeout arm is located at the peripheral portion of the takeout drum so as to be rockable within the vertical plane. The transfer arm and the takeout arm are rocked so as to face each other as they pass by a peripheral region in which the drums are situated close to each other, whereby the articles are moved straight upward by means of the transfer and takeout arms. A takeout conveyor mechanism extends upward from the peripheral region in which the transfer and takeout drums are situated close to each other. The articles moved upward by means of the transfer and takeout arms are received by the takeout conveyor mechanism. The received articles are transported upward while being decelerated by the conveyor mechanism. The decelerated articles are aligned in contact with one another by means of an aligning mechanism which is provided at the upper end portion of the takeout conveyor mechanism.

In the apparatus of the present invention constructed in this manner, the articles are held and moved upward by means of both the transfer arm of the transfer drum and the takeout arm of the takeout drum, and the raised articles are further moved upward to be delivered to the aligning mechanism by means of the takeout conveyor mechanism. Thus, the articles can be securely taken out from the transfer drum which is rotated within the vertical plane. The articles taken out in this manner are decelerated in the takeout conveyor mechanism as they are moved upward so that they can be delivered to the aligning mechanism without receiving a great impact. Thus, the articles cannot be damaged.

According to a preferred embodiment, the takeout conveyor mechanism is provided with a pair of endless conveyor belts which are arranged along the vertical direction and opposite to each other. Each conveyor belt is formed having retaining projections which are arranged at predetermined intervals. The retaining projections abut against the lower surface of each article, thereby moving the article upward. The distance between the retaining projections of the endless conveyor belt mechanisms is greater than the height of the articles, and which further comprises decelerating members located individually at the respective lower end portions of the conveyor belt mechanisms and adapted to engage the articles, thereby reducing the speed of upward movement of the articles. The distance between the retaining projections is greater than the dimension of the articles in the height direction. Accordingly, the articles held on the retaining projections can move upward. Thus, the received articles, which move upward by the inertia, are decelerated by the gravity, and are held on the retaining projections as they are transported upward.

In this embodiment, moreover, the takeout conveyor mechanism is fitted with brushes, and the articles move upward in sliding contact with the brushes to be decelerated thereby.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention will now be described with reference to the accompanying drawings. An apparatus according to this embodiment is a takeout/aligning apparatus which takes out finally packaged packs of cigarettes and delivers them to a seal pasting unit, in a cigarette packaging apparatus.

Figure 1:
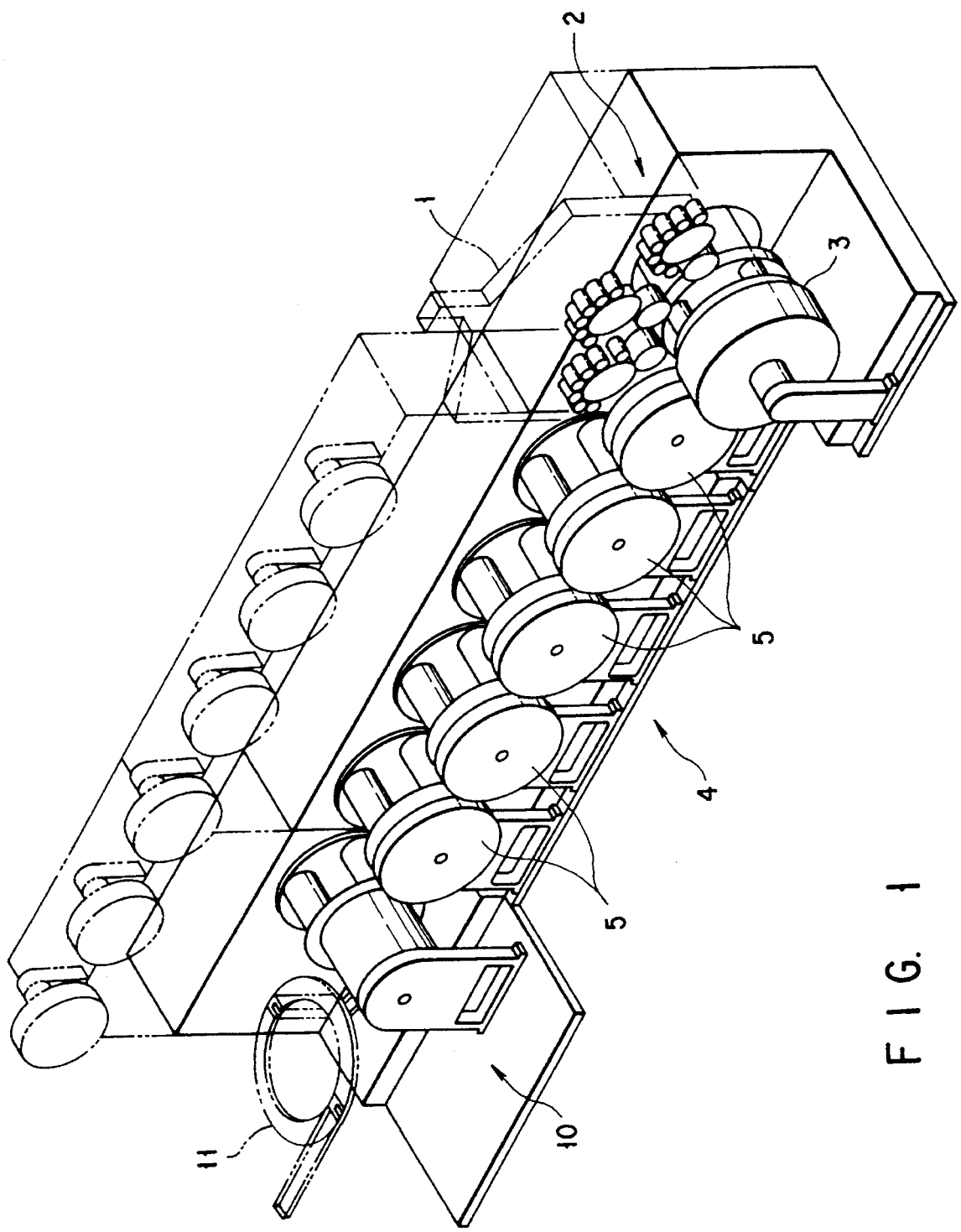
FIG. 1 is a perspective view showing an outline of a packaging apparatus with a takeout/aligning apparatus according to the present invention.

FIG. 1 shows an outline of the cigarette packaging apparatus. In FIG. 1, numeral 1 denotes a hopper, which is stored with a large number of cigarettes. The cigarettes are taken out by means of a takeout mechanism 2, which is composed of a series of takeout drums, and are stacked in three layers or rows for each pack, consisting of seven, six, and seven cigarettes, individually, on an offset-stacking head 3.

The cigarettes for each pack are packaged by means of the packaging apparatus 4. The packaging apparatus 4 is composed of a plurality of transfer drums 5, which are arranged adjacent to one another in their diametrical direction so that each two adjacent transfer drums 5 rotates synchronously in opposite directions, within a vertical plane.

Figure 2:
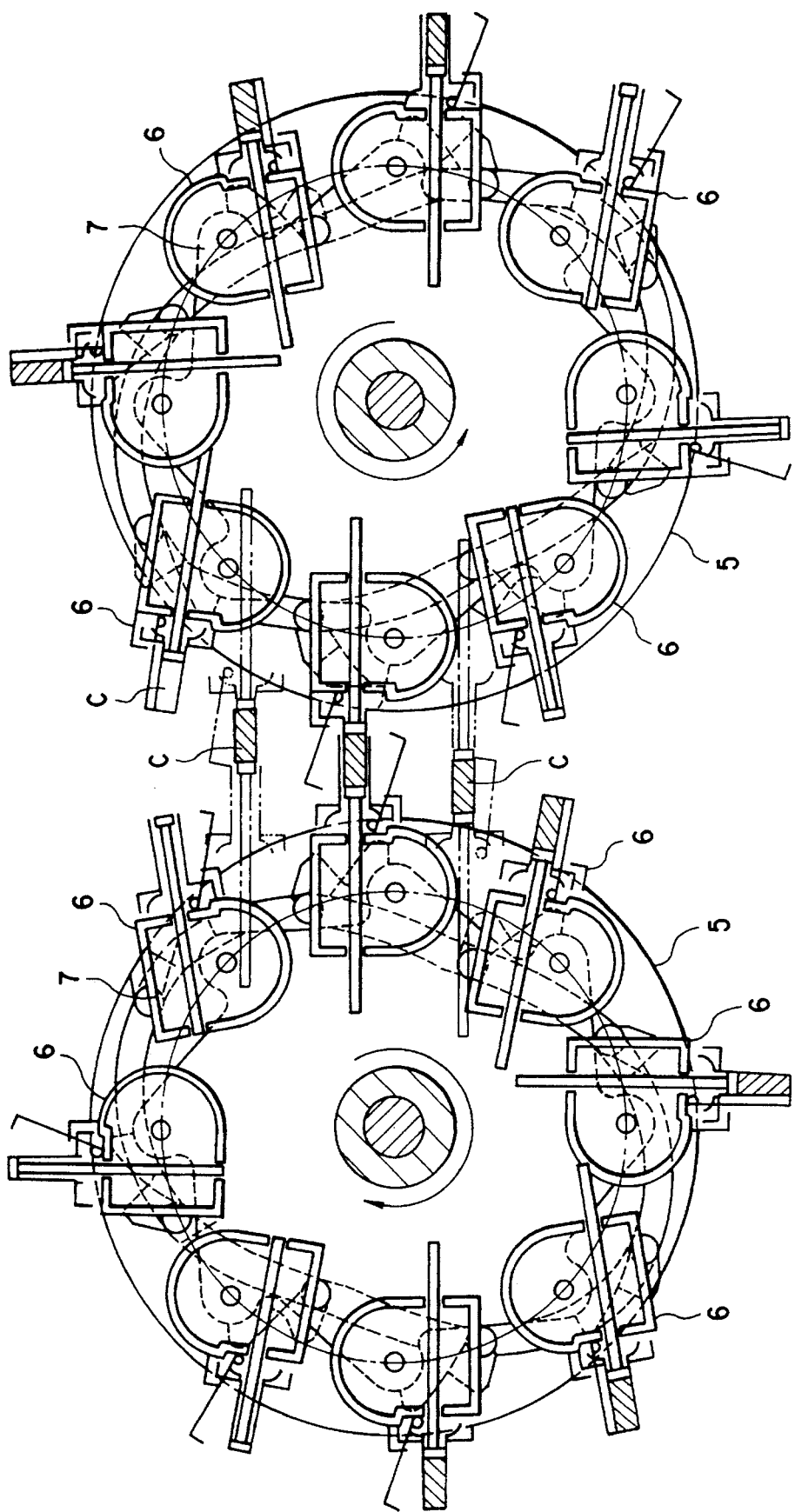
FIG. 2 is a front view showing transfer drums of the packaging apparatus.

As shown in FIG. 2, each transfer drum 5 is provided with a plurality of heads 6 which are rotatable within a vertical plane. Each head 6 is designed so as to be rotated properly in synchronism with the rotation of its corresponding transfer drum 5 by means of a cam mechanism 7. As the heads 6 pass by a region in which each two adjacent transfer drums 5 are situated close to each other, they rotate in a predetermined manner so as to face one another. While each pair of heads 6 move through this section, therefore, they make relative motions such that they oppositely approach and leave each other. As the heads 6 move through this section, moreover, cigarettes C for each pack are transferred from one head to another. Also, wrapping paper (not shown) is inserted between these heads 6 so that the cigarettes C for each pack are wrapped in the paper.

As this operation is repeated, the cigarettes for each pack are transported in succession between the heads of the transfer drums 5. In this process, the wrapping of the cigarettes in the wrapping paper, folding, and other operations are carried out to package the cigarettes for each pack completely.

Then, the wrapped cigarettes are taken out from the last transfer drum 5 and aligned in contact with one another by means of the takeout/aligning apparatus 10 according to the present invention, whereupon they are delivered to the seal pasting unit 11 in the next stage.

Figure 3:
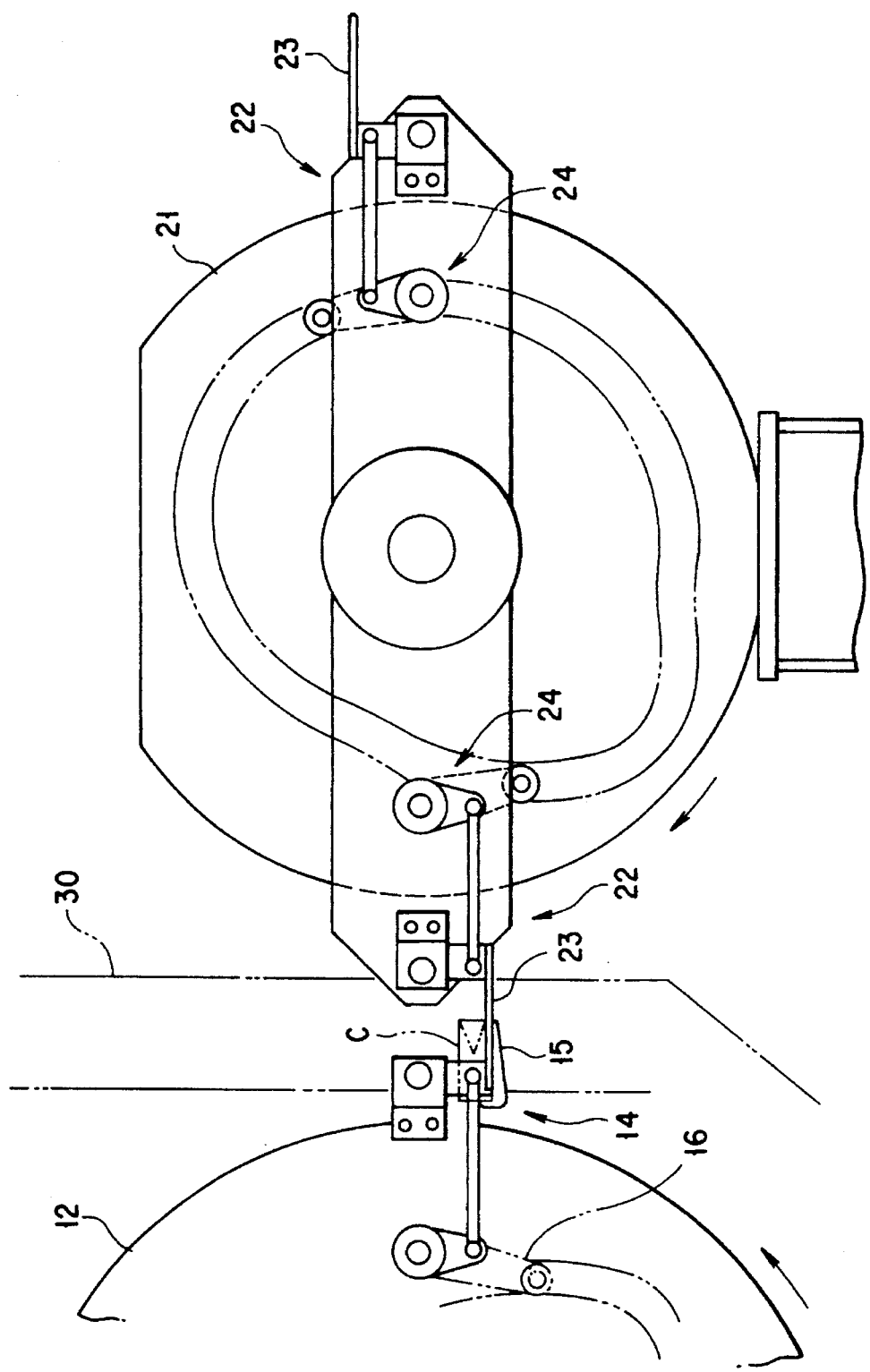
FIG. 3 is a front view showing drums of the takeout/aligning apparatus according to an embodiment of the invention.

Referring now to FIGS. 3 to 8, the takeout/aligning apparatus 10 according to the present invention will be described. In FIG. 3, numeral 12 denotes a transfer drum. The last transfer drum of the packaging apparatus 4 may be utilized as the drum 12, or otherwise, an exclusive drum may be for the takeout/aligning apparatus of the invention. The transfer drum 12 is rotated in synchronism with the transfer drums 5 of the packaging apparatus 4 within a vertical plane. A transfer head 14 is located at the peripheral portion of the transfer drum 12 so as to be rotatable within the vertical plane. The head 14 is provided with an L-shaped transfer arm 15. This transfer head 14 is driven by means of a cam mechanism 16 so that its transfer arm 15 rocks properly in synchronism with the rotation of the transfer drum 12.

A takeout drum 21 is provided diametrically adjoining the transfer drum 12. The drum 21, which is supported for rotation within the vertical plane, is rotated in synchronism with the transfer drum 12 in the direction opposite thereto by means of a drive mechanism (not shown). A plurality of takeout heads 22 are arranged around the takeout drum 21. Each head 22 is provided with a takeout arm 23 which is rockable within the vertical plane. The arm 23 is designed so as to rock properly in synchronism with the rotation of its corresponding takeout drum 21 by means of a cam mechanism 24.

Figure 4:
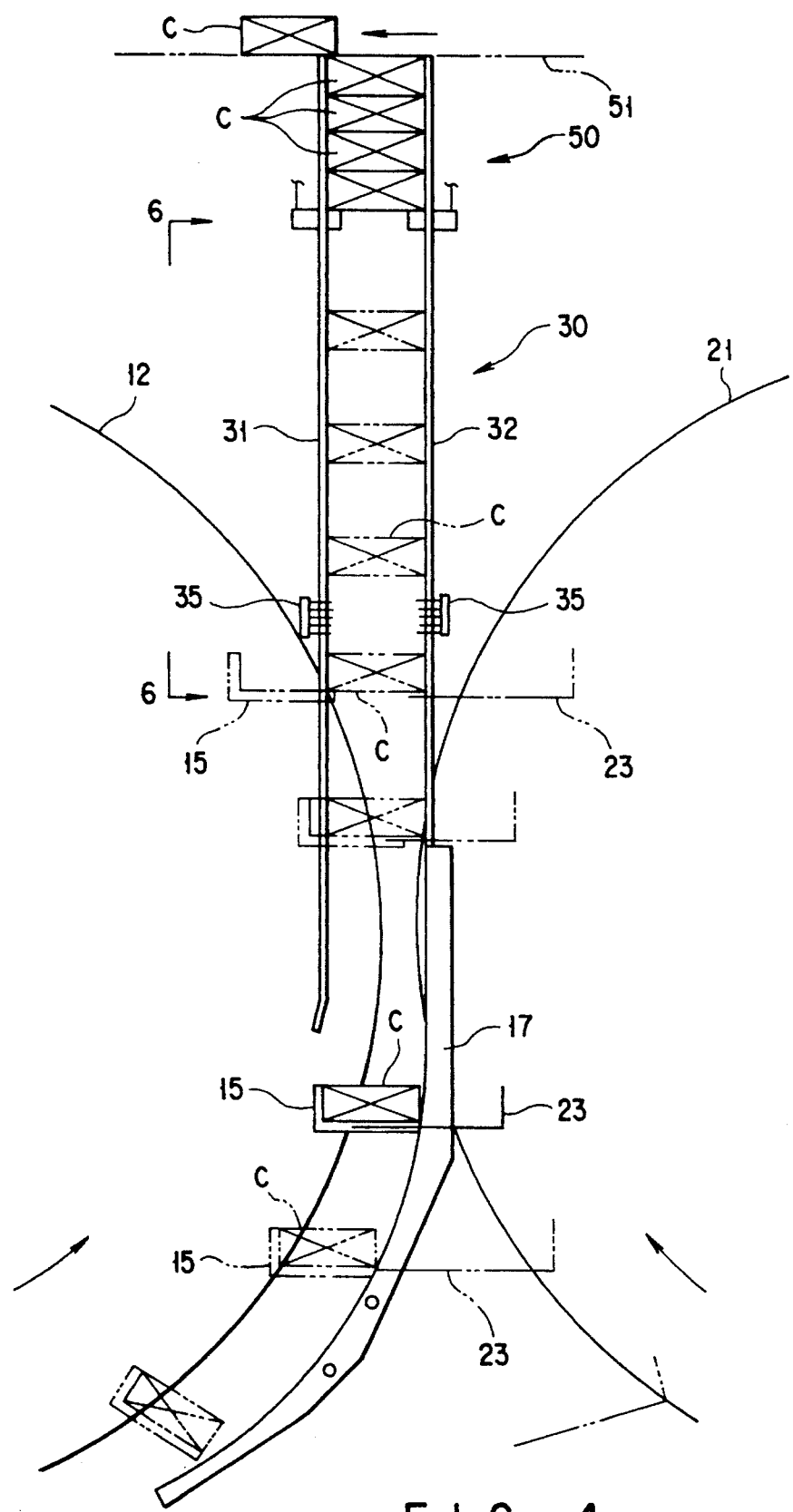
FIG. 4 is a front view showing guide members of the takeout/aligning apparatus according to the embodiment.

The transfer drum 12 and the takeout drum 21 rotate in synchronism with each other in the directions indicated by arrows in FIGS. 3 and 4. Thus, the transfer head 14 and the takeout head 22 correspondingly move upward at equal peripheral speeds in a section where the drums 12 and 21 are situated close to each other. While moving in this section, the transfer and takeout arms 15 and 23 of the transfer and takeout heads 14 and 22 are rocked to maintain a posture such that they are directed horizontally and opposed to each other. As they pass by this section, therefore, the arms 15 and 23 oppositely move toward and away from each other.

As shown in FIG. 4, moreover, an arcuate retaining guide member 17 is provided corresponding to the lower part of the transfer drum 12. The upper end portion of the guide member 17 extends up to the position where the transfer drum 12 and the takeout drum 21 are situated closest to each other. A cigarette pack C held by means of the transfer arm 15 moves along an arcuate path of transfer, guided by the retaining guide member 17, and maintains the state in which it is held by the arm 15. As it passes by the aforesaid section, the cigarette pack C, having so far being held by the transfer arm 15 only, starts to be supported by both the transfer and takeout arms 15 and 23, which horizontally face each other, as shown in FIG. 4. After passing the upper end portion of the guide member 17, the pack C is moved linearly upward. In FIG. 4, the way of movement of the transfer and takeout arms 15 and 23 are indicated by two-dot chain lines.

Figure 5:
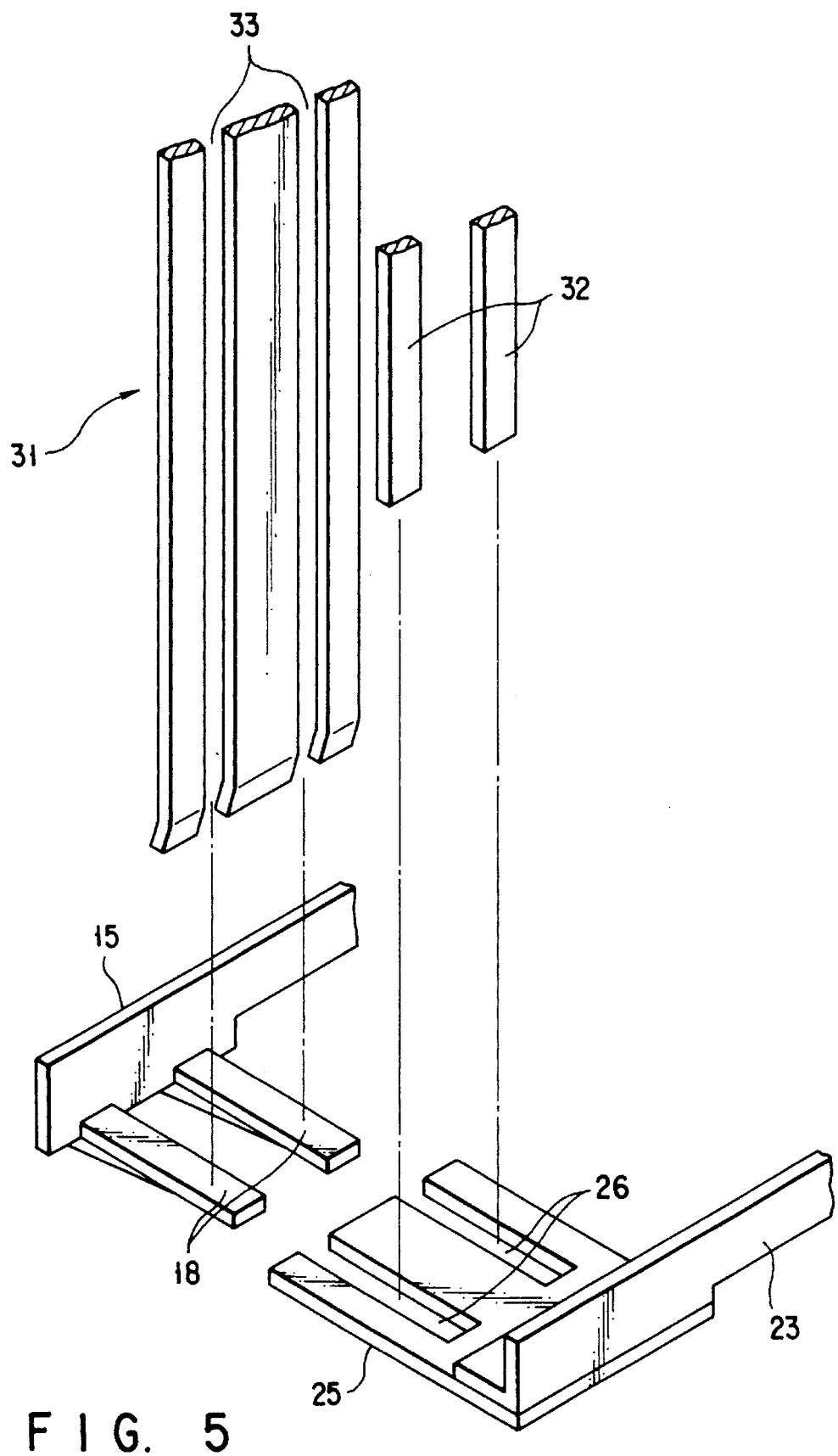
FIG. 5 is a perspective view showing a transfer arm, takeout arm, and takeout guide members.
Figure 6:
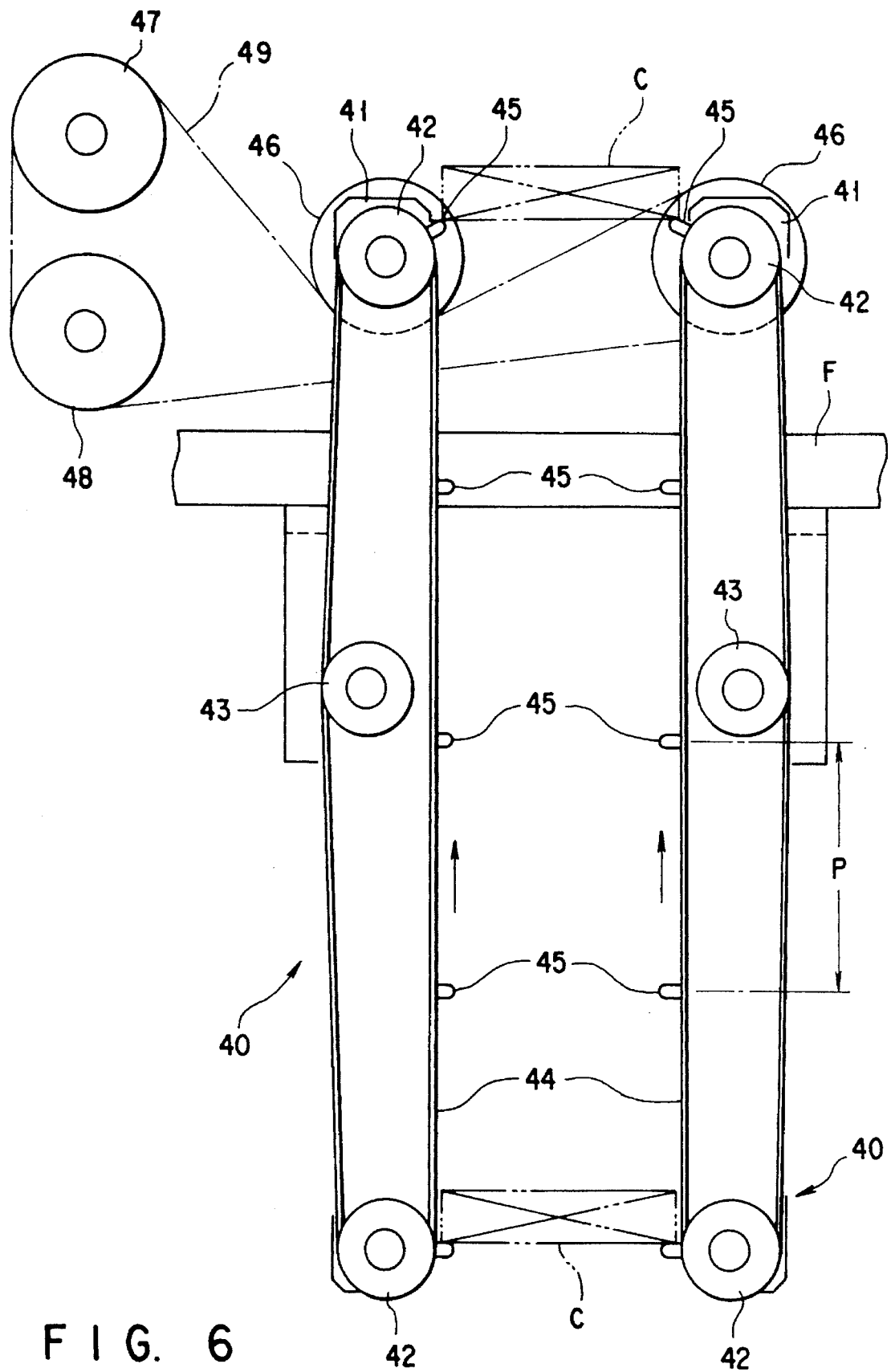
FIG. 6 is a fragmentary view of endless conveyor belt mechanisms taken in the direction of the arrows along line 6—6 of FIG. 4.

A takeout conveyor mechanism 30 is provided over the section where the transfer drum 12 and the takeout drum 21 are situated close to each other. Referring now to FIGS. 4 to 6, the construction of the conveyor mechanism 30 will be described.

The takeout conveyor mechanism 30 is provided with a pair of takeout guide members 31 and 32, as shown in FIG.

4. The lower end portion of the one takeout guide member 31 extends to the level below the upper end portion of the retaining guide member 17, while the lower end portion of the other takeout guide member 32 is substantially continuous with the upper end portion of the guide member 17. The distance between the guide members 31 and 32 is a little greater than the width of the cigarette pack C so that the pack C can be guided in upward movement between the members 31 and 32.

The takeout guide members 31 and 32 and the transfer and takeout arms 15 and 23 are constructed in the manner shown in FIG. 5, in order to avoid interfering with one another. More specifically, retaining members 18 for retaining the cigarette pack C protrude from the distal end portion of the transfer arm 15. These retaining members 18 are in the form of two fingers. A platelike retaining member 25 for retaining the cigarette pack C protrudes from the distal end portion of the takeout arm 23. The retaining member 25 is formed with two slits 26. The finger-shaped retaining members 18 of the transfer arm 15 are designed so as to be fitted individually in the slits 26 of the retaining member 25. Thus, the respective retaining members 18 and 25 of the transfer and takeout arms 15 and 23 can engagedly approach each other.

The one takeout guide member 31 is in the form of a plate having two slits 33 through which the retaining members 18 of the transfer arm 15 can be passed individually. The other takeout guide member 32 is in the form of two narrow strips, which can be passed individually through the slits 26 of the retaining member 25. Thus, the respective retaining members 18 and 25 of the transfer and takeout arms 15 and 23 can move without interfering with the guide members 31 and 32, in a manner such that their respective paths of transfer overlap the corresponding takeout guide members.

Accordingly, the cigarette pack C held by means of the transfer arm 15 first moves in a circular arc, guided by the retaining guide member 17. As the transfer and takeout arms 15 and 23 approach each other in the horizontal direction, the cigarette pack C is held by both the arms 15 and 23. When the pack C passes the upper end portion of the guide member 17, moreover, the cigarette pack C moves straight upward, guided straight in the vertical direction by the takeout guide members 31 and 32. As the transfer and takeout arms 15 and 23 then recede from each other, the pack C moves upward by the inertia. In doing this, the cigarette pack C is decelerated by the gravity acting on the cigarette pack C and friction with the takeout guide members 31 and 32.

Arranged at the respective lower parts of the takeout guide members 31 and 32, moreover, are a pair of brush members 35 for securing the deceleration. The bristles of the brush members 35 project inside the guide members 31 and 32 so that the cigarette pack C is decelerated by the force of friction therewith as it passes by the members 35.

Furthermore, a pair of endless conveyor belt mechanisms 40 are arranged in the direction perpendicular to the direction of arrangement of the takeout guide members 31 and 32. The distance between the mechanisms 40 is a little greater than the length of each cigarette pack C so that the pack C can be held between the two mechanisms.

Each endless conveyor mechanism 40 is provided with a base 41, which is mounted on a frame F or the like of the apparatus. A pair of pulleys 42 are arranged on the base 41, and an endless conveyor belt 44 of synthetic rubber or the like is passed around and stretched between the pulleys 42 for travel. The respective pulleys 42 of the two conveyor mechanisms 40 are synchronously rotated in opposite directions by means of their corresponding pulleys 46 and pulleys 47 and 48. Thus, the opposite portions of the two conveyor belts 44 are moved upward at the same speed. Numeral 43 denotes an idler pulley for adjusting the tension of each conveyor belt 44.

Retaining projections 45 are arranged at regular intervals on each conveyor belt 44. Thus, each cigarette pack C guided and transported by means of the takeout guide members 31 and 32 is moved upward in a manner such that it is held between the two belts 44 and on the projections 45.

The distance (P) between the retaining projections 45, the traveling speed of the conveyor belts 44, the peripheral speed of the transfer and takeout drums 12 and 21, etc. are adjusted to the following conditions. The cigarette packs C are aligned in contact with one another by means of an aligning mechanism (mentioned later), and are intermittently delivered one after another to the seal pasting unit 11. The distance P between the retaining projections 45 and the traveling speed of the conveyor belts 44 are set so that the cigarette packs C held on the projections 45 are fed in synchronism with the intermittent delivery by means of the aligning mechanism. If the distance P between the projections 45 is adjusted to a greater value, therefore, the traveling speed of the conveyor belts 44 becomes higher. In this embodiment, the traveling speed of the belts 44 is lower than the peripheral speed of the transfer and takeout drums 12 and 21. As compared with several meters per second for the peripheral speed of the drums 12 and 21, for example, the traveling speed of the belts 44 set at tens of centimeters per second. The distance P between the retaining projections 45 is adjusted to a value several times as great as the height of each cigarette pack C.

Accordingly, the moving speed of the cigarette pack C delivered to the respective lower ends of the endless conveyor belt mechanisms 40 is higher than the traveling speed of the conveyor belts 44. Since the distance P between the retaining projections 45 of the belts 44 is greater than the height of each cigarette pack C, however, the pack C at the lower ends of the conveyor belt mechanisms 40 is decelerated by the brush members 35 before it runs against the projections 45 above it. Thus, the cigarette pack C is carried on the projections 45 thereunder as it is moved upward. Since the cigarette pack is relatively light in weight, it can be fully decelerated by means of the force of friction with various parts and gravity only. If the distance P between the projections 45 and the traveling speed of the conveyor belts 44 are set at relatively great and high values, respectively, the brush members 35 can be omitted.

The cigarette pack C slowly decelerated and taken out from the head 14 of the transfer drum 12 in this manner is delivered to the aligning mechanism 50, which is located at the upper end portion of the takeout conveyor mechanism 30.

Figure 7:
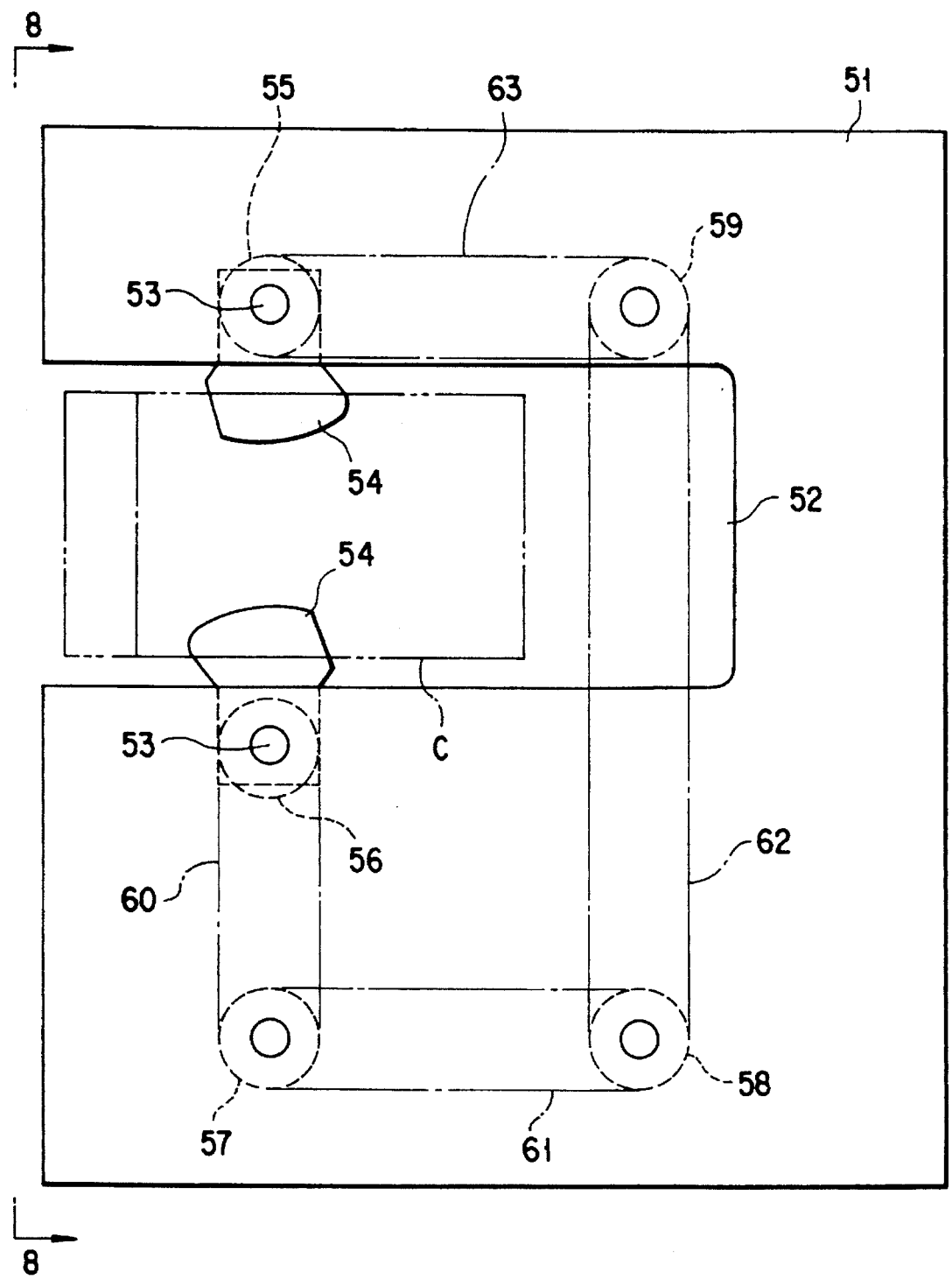
FIG. 7 is a plan view of an aligning mechanism.
Figure 8:
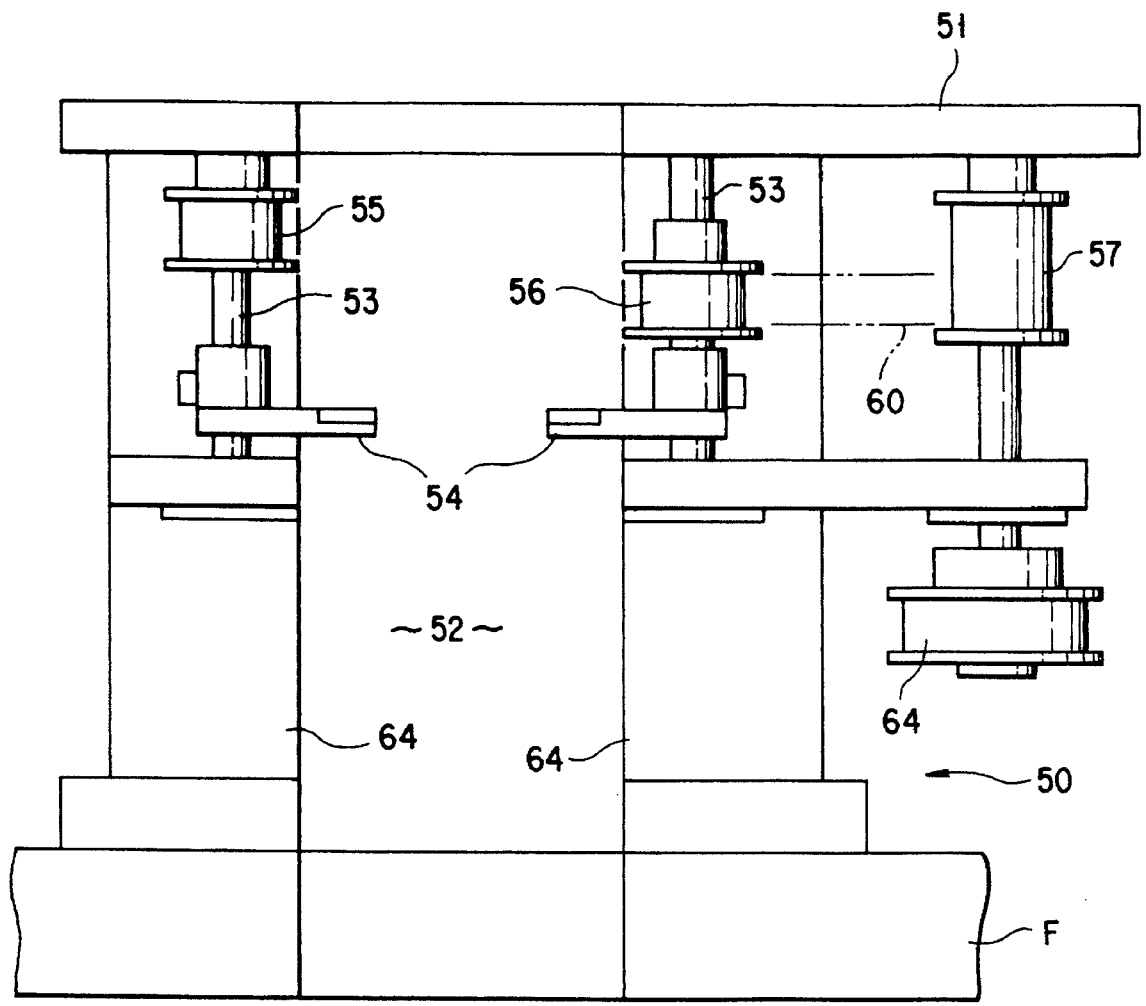
FIG. 8 is a fragmentary view taken in the direction of the arrows along line 8—8 of FIG. 7.

Referring now to FIGS. 7 and 8, the aligning mechanism 50 will be described. In these drawings, numeral 51 denotes a base, which is mounted on the frame F or the like of the apparatus by means of members 64. An aligning passage 52 is defined between the frame F and the members 64 and through the base 51. The cigarette packs C are aligned vertically in contact with one another in the aligning passage 52. The upper surface of the base 51 is formed as a transportation surface. The cigarette packs C pushed up onto the upper surface of the base 51 are fed one after another to the seal pasting unit 11.

A pair of rotating shafts 53 are arranged individually on the opposite sides of the aligning passage 52. A fan-shaped retaining vane 54 is mounted on each of the shafts 53. The shafts 53 are rotated intermittently so that the retaining vanes 54 thereon recede to the outside of the aligning passage 52, thereby allowing each cigarette pack C to be forced into the passage 52, only when the packs C are pushed up by the takeout conveyor mechanism 30. After the vanes 54 are passed by each cigarette pack C, the vanes 54 project into the passage 52, and hold the lowermost pack C, among a nest of cigarette packs C aligned in contact with one another in the passage 52, thereby maintaining the nest.

The rotating shafts 53 are continuously synchronously rotated in opposite directions by means of pulleys 55, 56, 57, 58 and 59 and belts 60, 61, 62 and 63 thereon. These members are driven in synchronism with the operation of the takeout conveyor mechanism 30, by a drive mechanism (not shown) with the aid of a belt which is passed around a pulley 64.

The present invention is not limited to the embodiment described above. More specifically, the invention is not limited to the takeout/aligning apparatus for cigarette packs, and may be also applied to takeout/aligning apparatuses for various other articles.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for taking out articles, which are delivered thereto in a manner such that the articles are held on heads arranged around a rotating body rotating within a vertical plane, and aligning the articles in contact with one another, comprising:

a transfer drum and a takeout drum arranged diametrically adjacent to each other and rotatable synchronously in opposite directions within a vertical plane;

a transfer arm located at the peripheral portion of the transfer drum and rockable within the vertical plane and a takeout arm located at the peripheral portion of the takeout drum and rockable within the vertical plane, the transfer arm and the takeout arm being adapted to rock so as to face each other as the arms pass by a peripheral region in which the drums are situated close to each other, whereby the articles are moved straight upward in a manner such that the articles are held by means of the transfer arm and the takeout arm;

a takeout conveyor mechanism extending upward from the peripheral region in which the transfer drum and the takeout drum are situated close to each other, the articles moved upward by means of the transfer arm and the takeout arm being transferred to the takeout conveyor mechanism so that the articles are transported upward while being decelerated by the conveyor mechanism; and an aligning mechanism provided at the upper end portion of the takeout conveyor mechanism, the aligning mechanism receiving the articles decelerated by the conveyor mechanism and aligning the articles in contact with one another.

2. An apparatus according to claim 1, wherein said takeout conveyor mechanism is provided with a pair of endless conveyor belt mechanisms arranged opposite and parallel to each other, the conveyor belt mechanisms each including a conveyor belt having retaining projections protruding therefrom at predetermined intervals, the articles being moved upward in a manner such that the articles are held on the retaining projections of the endless conveyor belt mechanisms.

3. An apparatus according to claim 2, wherein the distance between said retaining projections of said endless conveyor belt mechanisms is greater than the height of the articles, and which further comprises decelerating members located individually at the respective lower end portions of the conveyor belt mechanisms and adapted to engage the articles, thereby reducing the speed of upward movement of the articles.

4. An apparatus according to claim 3, wherein said decelerating members are brushes.

5. An apparatus according to claim 1, wherein said transfer arm and said takeout arm have a shape such that the arms can fit each other in the diametrical direction of the transfer drum and the takeout drum, and oppositely engagedly approach and leave each other as the arms pass by the peripheral region in which the drums are situated close to each other.

6. An apparatus according to claim 1, wherein said aligning mechanism includes a pair of retaining vanes adapted to engage and hold the lower end of a nest of the articles transported thereto in contact with one another and in a vertically aligned state by means of the takeout conveyor mechanism, the retaining vanes being adapted to release the hold on the nest of the articles when the articles are transported by the takeout conveyor mechanism, whereby the articles fed upward by the conveyor mechanism are delivered to the lower end of the article nest so that the articles in the aligning mechanism are pushed up one by one.

\* \* \* \* \*